(12) United States Patent
Serruijs et al.

(10) Patent No.: US 11,867,502 B2
(45) Date of Patent: *Jan. 9, 2024

(54) METHOD OF ELECTRONICALLY TRACKING PHYSICAL DEPOSITION OF COATING MATERIAL

(71) Applicant: Proxcontrol IP B.V., IJmuiden (NL)

(72) Inventors: Remy Michel Serruijs, IJmuiden (NL); Ronnie Jacobus Samuel Nieuwenburg, Harderwijk (NL); Rob Keij, Heerhugowaard (NL)

(73) Assignee: PROXCONTROL IP B.V., Ijmuiden (NL)

( * ) Notice: Subject to any disclaimer, the term of this patent is extended or adjusted under 35 U.S.C. 154(b) by 51 days.

This patent is subject to a terminal disclaimer.

(21) Appl. No.: 17/527,567

(22) Filed: Nov. 16, 2021

(65) Prior Publication Data

US 2022/0234065 A1    Jul. 28, 2022

(30) Foreign Application Priority Data

Jan. 27, 2021  (NL) ...................................... 2027445

(51) Int. Cl.
  *G01B 21/08*   (2006.01)
  *B05D 1/02*    (2006.01)
  (Continued)

(52) U.S. Cl.
  CPC ............ *G01B 21/08* (2013.01); *B05B 12/008* (2013.01); *B05B 12/02* (2013.01); *B05B 12/16* (2018.02); *B05D 1/02* (2013.01); *C23C 18/06* (2013.01)

(58) Field of Classification Search
  CPC ....... G01B 21/08; B05B 12/008; B05B 12/02; B05B 12/16; B05B 12/12; B05B 12/126;
  (Continued)

(56) References Cited

U.S. PATENT DOCUMENTS

| 5,868,840 A | 2/1999 | Klein, II et al. |
| 2005/0242205 A1* | 11/2005 | Jarvis ................... B05B 12/004 239/71 |

(Continued)

FOREIGN PATENT DOCUMENTS

| EP | 3375323 A1 | 9/2018 |
| EP | 3674961 A1 | 7/2020 |

OTHER PUBLICATIONS

Search Report and Written Opinion issued in corresponding Netherlands Patent Application No. NL 2027445, dated Oct. 7, 2021 (11 pgs.).

*Primary Examiner* — Dah-Wei D. Yuan
*Assistant Examiner* — Nga Leung V Law
(74) *Attorney, Agent, or Firm* — Pillsbury Winthrop Shaw Pittman, LLP (57) ABSTRACT

By measuring a position of a spray gun relative to a physical surface to coat, using data on technical characteristics of the spray gun, like a spray cone the spray gun may produce and data on a coating fluid used, characteristics of a coating layer thus physically deposited may be reconstructed. With data being recording during the spray job, this is faster and more accurate than measuring layer thickness at various locations, either pre-determined or randomly. By determining flow characteristics in a spray cone and position of the spray cone relative to the surface over time and using a model of the spray cone, deposition of the layer of coating may be determined and the final layer, cured or uncured, may be reconstructed, including thickness.

15 Claims, 4 Drawing Sheets

(51) Int. Cl.
    *C23C 18/06*     (2006.01)
    *B05B 12/16*     (2018.01)
    *B05B 12/00*     (2018.01)
    *B05B 12/02*     (2006.01)

(58) Field of Classification Search
    CPC ..... B05B 12/08; B05B 12/082; B05B 12/124; B05D 1/02; C23C 18/06
    See application file for complete search history.

(56) References Cited

U.S. PATENT DOCUMENTS

| | | |
|---|---|---|
| 2009/0179081 A1 | 7/2009 | Charpie |
| 2016/0368011 A1 | 12/2016 | Feldhaus et al. |
| 2017/0312775 A1* | 11/2017 | Franks ..................... B05B 9/01 |

* cited by examiner

METHOD OF ELECTRONICALLY TRACKING PHYSICAL DEPOSITION OF COATING MATERIAL

CROSS-REFERENCE TO RELATED APPLICATIONS

This application claims priority to Netherlands Application No. NL 2027445, filed Jan. 27, 2021, the contents of which are herein incorporated by reference in its entirety.

TECHNICAL FIELD

The invention relates to a sensor kit for a spray gun and processing of data received from the sensor kit.

BACKGROUND

Spray painting is a technique of using a spray gun to spray a coating through the air onto a surface. The coating may be a paint, ink, varnish, clear coat, or any other type of coating. A spray gun may be hand-held by an operator, and it may require significant skill to apply a thin coating with consistent layer thickness. Whether or not the operator has skill, final thickness of the layer may vary, which may have an impact on durability of the coating and reliability of sensors covered by the coating, like proximity radar systems of cars.

SUMMARY

In order to track the result of the coating process, it is preferred to have data on the final layer of coating available, in particular with respect to an amount of coating material available on the surface to coat, per unit of area.

A first aspect provides a method of electronically tracking of spray coating of a coating fluid on a physical surface by a spray gun arranged to spray the coating fluid in a spray direction. The method comprises, in an electronic computing system receiving, from a distance sensor module comprising at least one distance sensor, the distance sensor module being connected to the spray gun, distance data provided with a second timestamp, the distance data indicating a physical distance between the spray gun and the surface, obtaining, from an electronic memory, three-dimensional coating model data of a spray cone associated with the spray gun, receiving, from a positional sensing system connected to the spray gun, position data provided with a third timestamp, the position data providing an indication of the spray gun relative to a first position on the physical surface; and obtaining coating fluid flow data provided with a first timestamp, the fluid flow data providing an indication of a mass flow rate of the coating fluid through the spray gun. The method further comprises adjusting the coating model data based on the coating fluid flow data, matching the fluid flow data, the distance data and the position data over time based on the first timestamp, the second timestamp and the third timestamp and calculating, based on the distance data, the position data and the three-dimensional coating model, coating deposition area data of positional spray coating deposition on an area of the physical surface per unit of time. The calculating of the coating deposition area data may be executed based on the matched data.

Spray guns for spraying coating fluids are precision instruments, of which characteristics are well known. One particular characteristic is the shape of the spray cone, the flow rate of coating fluid and the density of fluid in the spray cone. With the flow rate or speed and other characteristics of droplets, a model of the spray cone, a three-dimensional coating model may be construed. Such model may comprise, at various locations in the cone, for example at regular grid points, each grid point representing a particular volume, a mass flow or volume flow within the particular volume. With the distance data, the location of the physical surface on which the coating fluid impinges is known relative to the nozzle of the spray gun may be determined. And with that information, the mass flow or volume flow of coating fluid within the spray cone at the physical surface may be determined as positional spray paint deposition, in this case per unit of time. If data from multiple entities is to be used over time, the data may be synchronised using time stamps by matching the time stamps and aligning data based on matching time stamps. Network routers, wired and wireless, may be arranged to provide timing data. With such timing data being synchronised, it may serve providing timestamps suitable for synchronisation.

An implementation of the first aspect further comprises calculating, based on the distance data, the position data, the coating deposition area data and time, characteristics of a layer of coating fluid on the physical surface. With a deposition rate of coating fluid known in a plane where the physical surface and the spray cone intersect, building up of a layer by virtue of that deposition may be calculated, including characteristics of that layer.

In another implementation, the positional sensing system comprises a first accelerometer for determining a first acceleration substantially perpendicular to the spray direction and a second accelerometer for determining a second acceleration substantially perpendicular to the spray direction, the first direction being substantially perpendicular to the second direction. The method further comprises integrating the first acceleration in time twice over time for obtaining first displacement data in the first direction as a first part of the position data and integrating the second acceleration in time twice over time for obtaining second displacement data in the second direction as a second part of the position data.

By integrating acceleration once over time, velocity data may be determined. By integrating the velocity over time—or by integrating the acceleration over time—displacement of the sensor kit may be calculated. And with the sensor kit attached to a spray gun with a pre-determined position and orientation of the nozzle of the spray gun, velocity and displacement of the nozzle may be calculated. And with that, displacement of the spray cone may be determined. With the directions perpendicular to the spray direction of the nozzle and an assumption that an operator will always spray in a direction perpendicular to the physical surface to spray, displacement of the spray cone and the plane of intersection of the spray cone and the surface may be determined. This data may be used to determine deposition of coating fluid on the surface over time, over an area over which the cone is displaced. Additionally, other data, like distance data may be used.

Yet another implementation further comprises determining, based the received position data, whether the spray gun is moving in a swinging motion and starting the calculating if it is determined that the spray gun is moving in a swinging motion. Spraying of coating fluids is mostly done by swinging the spray gun. An amount of actuators on the spray kit is preferably kept as low as possible, if possible such actuable inputs are eliminated. By automatic detection of a start of the spraying process, no actuator may be required to start the logging of data.

in yet a further implementation, the positional sensing system comprising at least one of a first accelerometer and a second accelerometer and determining whether the spray gun is moving in a swinging motion comprises determining whether the acceleration value of at least one of a first accelerometer and a second accelerometer changes sign at least two times during a pre-determined interval. Swinging may be performed sideways, up and down or a combination thereof. At the extremities of a swing and in the middle of a swing, the value of the acceleration will change sign.

In again a further embodiment, determining whether the spray gun is moving in a swinging motion comprises determining whether the acceleration value of at least one of a first accelerometer and a second accelerometer changes sign at least three times during a pre-determined interval and a first time period between a first sign change and a second sign change varies from a second time period between the second sign change and a third sign change by less than a pre-determined amount. In a full swing, from one extremity to another extremity, including the extremities, the acceleration will change sign three times. In an even swing, the time periods between the zero crossing will be substantially the same —give or take 2% to 5% or possibly 5% to 10%.

Again another implementation further comprises determining an orientation of the spray gun and the spray direction relative to the physical surface and calculating the coating deposition area data of positional spray coating deposition is also based on the orientation. In case the spray direction of the spray gun is not aimed perpendicularly at the physical surface on which paint or another coating is to be deposited, the coating fluid may not be deposited in the intended circular or elliptical area, but in an area having a different shape. Using data on the orientation of the spray cone relative to the physical surface and using angle data in particular aids in this issue.

In a further implementation, the distance sensor module comprises multiple distance sensors and determining the orientation comprises obtaining multiple distance sensor values from the comprises multiple distance sensors and determining the orientation based on differences between the multiple distance sensor values. With distance sensors provided in a plane perpendicular to the spray direction, distances detected are substantially equal. If the sensor kit and with that, the spray direction is not provided to the physical surface in a perpendicular direction, the distances measures are different and with that, also sensor values. From the sensor values, the angle may be determined.

Another implementation further comprises receiving, from the positional sensing system, rotational data indicative of a rotational position of the spray gun transversal to the spray direction and determining, based on the position data and the rotational data, the orientation. This provides another way of determining the orientation.

In again another implementation, calculating the coating deposition area data of positional spray coating deposition comprises determining cone intersection plane coating fluid data, based on the distance data and the three-dimensional coating model data and calculating the coating deposition area data of positional spray coating deposition is based on the cone intersection plane coating fluid data. The cone intersection plane coating fluid data may comprise data on a deposition rate in a particular area, for example volume or mass. The intersection of cone and physical surface defines an area and deposition may be determined in that area. And if displacement data over time is used, a layer and thickness thereof on the physical surface may be determined.

Again another implementation further comprises receiving an input related to selection of a pre-determined coating fluid; and obtaining the three-dimensional coating model data of the spray cone associated with the spray gun in response to providing data related to the pre-determined coating fluid to the electronic memory. Different types of coating have different characteristics. With this implementation, different characteristics may be taken into account, providing more accurate data. Additionally or alternatively, other data like humidity, temperature, other environmental data on an ambient environment, other data, or a combination thereof may be taken into account.

Again a further implementation further comprises obtaining coating fluid flow data providing an indication of a mass flow rate of the coating fluid through the spray gun and adjusting the coating model data based on the coating fluid flow data. Different types of coating may have different spray characteristics, like droplet size, droplet density, viscosity, relative mass, flow rate dependency on air pressure and/or air flow, other, or a combination thereof. This implementation takes that into account, providing more accurate data. Coating fluid data may be indicated by a directly or indirectly measured mass flow or volume flow of coating fluid. A flow of actual coating fluid may be measured and determined. Alternatively of additionally, flow of air, optionally with features including at least one of pressure, mass flow, flow velocity, supply duct bore diameter, other, or a combination thereof and the flow of coating fluid may be determined based on the flow of air and, optionally, other parameters.

Another implementation further comprises calculating, based on the coating deposition area data of positional spray coating deposition on the area of the physical surface per unit of time, thickness of a layer of coating fluid on the physical surface. With a total mass flow available, distribution of the flow over the cone and the location of the physical surface relative to the cone over time, the total deposition of coating fluid per unit area may be determined over time. At the moment the spray job has ended, thickness of a layer may be determined.

Again another implementation further comprises obtaining curing data related to the coating fluid and based on the curing data, determining cured thickness of a cured layer of coating fluid on the physical surface. In particular applications, the thickness of the cured layer is relevant, in particular at certain locations on the physical surface. The thickness of the cured layer is generally less than the thickness of a layer that has just been sprayed. The relation between a just sprayed layer, that may be wet, and a cured layer, that may be dry, may be linear or non-linear.

A second aspect provides an electronic computing device configured for electronically tracking of spray coating of a coating fluid on a physical surface by a spray gun arranged to spray the coating fluid in a spray direction. The device comprises a communication unit arranged to receive, from a distance sensor module comprising at least one distance sensor, the distance sensor module being connected to the spray gun, distance data indicating a physical distance between the spray gun and the surface, obtain, from an electronic memory, three-dimensional coating model data of a spray cone associated with the spray gun, receive, from a positional sensing system connected to the spray gun, position data providing an indication of the spray gun relative to a first position on the physical surface. The device further comprises a processing unit arranged to calculate, based on the distance data, the position data and the three-dimensional coating model, coating deposition area data of positional spray coating deposition on an area of the physical surface per unit of time. As such, the second aspect relates to provides an electronic computing device configured for electronically tracking of spray coating of a coating fluid on a physical surface by a spray gun arranged to spray the coating fluid in a spray direction, wherein the device is arranged to execute the method according to the first aspect.

A third aspect provides a computer program product comprising computer executable instructions causing a computer, when the instructions are executed by a processor comprised by the computer, to execute a method of electronically tracking of spray coating of a coating fluid on a physical surface by a spray gun arranged to spray the coating fluid in a spray direction. The method comprises receiving, from a distance sensor module comprising at least one distance sensor, the distance sensor module being connected to the spray gun, distance data indicating a physical distance between the spray gun and the surface, obtaining, from an electronic memory, three-dimensional coating model data of a spray cone associated with the spray gun, receiving, from a positional sensing system connected to the spray gun, position data providing an indication of the spray gun relative to a first position on the physical surface and calculating, based on the distance data, the position data and the three-dimensional coating model, coating deposition area data of positional spray coating deposition on an area of the physical surface per unit of time. As such, the third aspect provides a computer programme product comprising computer executable instructions causing a computer, when the instructions are executed by a processor comprised by the computer, to execute the method according to the first aspect.

A fourth aspect provides a non-transitional medium having stored thereon computer program product comprising computer executable instructions causing a computer, when the instructions are executed by a processor comprised by the computer, to execute a method of electronically tracking of spray coating of a coating fluid on a physical surface by a spray gun arranged to spray the coating fluid in a spray direction. The method comprises receiving, from a distance sensor module comprising at least one distance sensor, the distance sensor module being connected to the spray gun, distance data indicating a physical distance between the spray gun and the surface, obtaining, from an electronic memory, three-dimensional coating model data of a spray cone associated with the spray gun, receiving, from a positional sensing system connected to the spray gun, position data providing an indication of the spray gun relative to a first position on the physical surface and calculating, based on the distance data, the position data and the three-dimensional coating model, coating deposition area data of positional spray coating deposition on an area of the physical surface per unit of time. As such, the fourth aspect relates to provides a non-transitional medium having stored thereon computer programme product comprising computer executable instructions causing a computer, when the instructions are executed by a processor comprised by the computer, to execute the method according to the first aspect.

BRIEF DESCRIPTION OF THE DRAWINGS

The various aspects and embodiments thereof will now be discussed in further details in conjunction with drawings. The drawings show possible implementations of the various aspects and embodiments thereof and are provided as examples and not as any limitation to the subject-matter of the claims. In the Figures.

DETAILED DESCRIPTION

Figure 1:
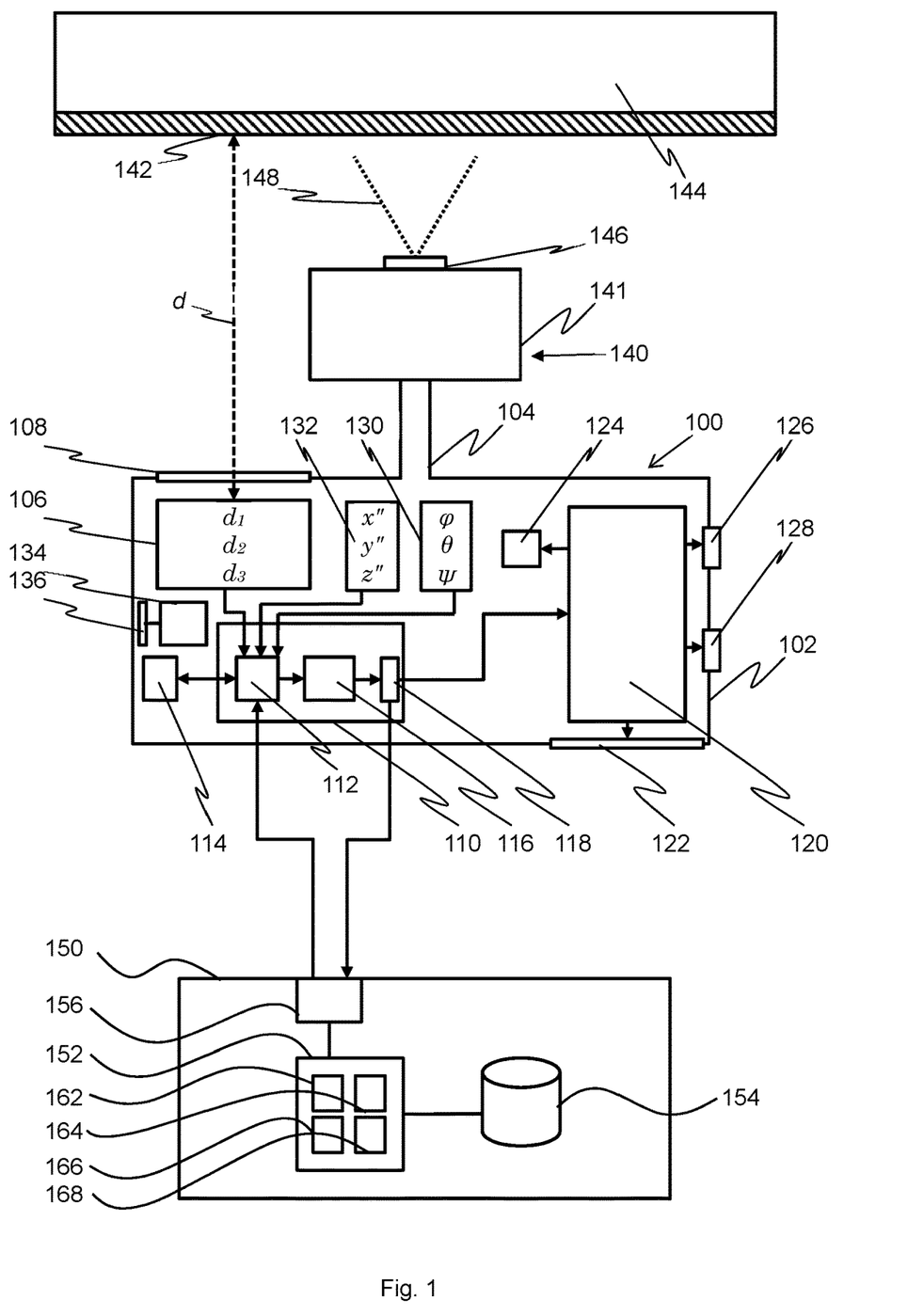
FIG. 1: shows a schematic overview of an example of a sensor kit, a spray gun and a surface.

FIG. 1 depicts a schematic overview of an embodiment of a sensor kit 100 comprising a sensor kit body 102 as a housing. The sensor kit body 102 comprises a spray gun connector 104 as a connection module. A spray gun 140 is connected to the body 102 via the connector 104. The spray gun 140 comprises a spray gun housing 141. The spray gun 140 may for example be a High Volume Low Pressure (HVLP) spray gun.

Although the sensor kit body 102 is in FIG. 1 depicted schematically as a rectangle, in different embodiments the body 102 may have a different shape. For example, the body 102 can be shaped around the shape of the spray gun housing 141 to which it is arranged to be connected. The shape of the body 102 and/or centre of gravity of the sensor kit 100 may also be adapted such that, when attached to spray gun 140, the centre of gravity of the spray gun 140 is kept within a desired range. As such, handling of the spray gun 140 may be minimally affected by connecting the sensor kit 100.

The spray gun 140 may be used for applying a layer of paint 142 as a coating on a car body part 144 as a surface. The spray gun 140 comprises a nozzle 146 from which a mist of aerosol paint 148 can be expelled, and an input for receiving the paint as a coating substance. The spray gun 140 may be a hand-held spray gun 140, comprising a trigger which a user can operate to control expelling of paint 148 from the spray gun 140 at a certain rate.

The trigger may control a throughput area of a conduit leading paint or another coating fluid to the nozzle. Alternatively or additionally, the trigger—or another trigger or a control knob—may control a position of a control needle in a throughput orifice, for example the nozzle 146 or another orifice. In one embodiment, a control needle may be used to accurately control a flow of coating fluid and a trigger may be used to switch between an "on" an "off" state of the nozzle. In addition to the accurate control mechanism, the flow of coating fluid may also be control be varying pressure under which the coating fluid is provided. One or more of the precision control settings, the coating fluid pressure and the trigger state may be considered as optional spray job parameters.

The user can move and re-orientate the spray gun 140 as desired, and thus move it further away from the car body part 144 or closer to the car body part 144 with a certain speed and acceleration. The user can further orientate the spray gun 140 as desired, and thus change the orientation of the nozzle 146 relative to the car body part 144 such that paint can be applied from different angles of approach.

Provided in the sensor kit body 102 is a distance sensor module 106 comprising one or more time-of-flight sensors as proximity sensors comprised by the distance sensor module 106. The time-of-flight sensors are arranged for obtaining distance data as spray job parameter values on distances d1, d2 and d3 between each of the sensors and the car body part 144 and/or the layer of paint 142. As such, the time-of-flight sensors in the distance sensor module 106 preferably face the same direction as the nozzle 146 when the sensor kit 100 is connected to the spray gun 140, as the nozzle 146 will also face the car body part 144 and/or the layer of paint 142.

The time-of-flight sensors as the proximity sensor may comprise a laser or LED as an optical transmitter arranged to emit a laser beam as an emitted optical signal. The time-of-flight sensors may further comprise an optical receiver for receiving a reflected optical signal as a reflection of the laser beam. A proximity processor may be used to determine a spray distance between the time-of-flight sensors and the surface 144 based on a relation between the emitted laser beam and the reflected laser beam.

The emitted optical signal may have a near infrared wavelength spectrum, for example between 800 and 1140 nm, more in particular between 900 nm and 1000 nm and most preferably 940 nm. Electromagnetic radiation of such wave is not visible; it may travel through substance that may seem opaque to the human eye, but is transparent for electromagnetic radiation between 900 nm and 1000 nm and 940 nm in particular.

The sensor kit body 102 may comprise non-translucent materials, and as such light emitted by the time-of-flight sensors may be hindered by the sensor kit body 102. In the embodiment of FIG. 1, the sensor kit body 102 comprises as an option an at least partially translucent viewing window 108 through which light emitted by and reflected back to the time-of-flight sensors can pass. Alternatively, at least part of the sensor kit body 102 through which light should pass may be made of material which is at least partially translucent for wavelengths of light used by the time-of-flight sensors, which may for example be wavelengths in the infra-red spectrum.

In one embodiment, the time of flight sensors are spaced apart at such distance that at a normal spraying distance, between 20 centimetres and 50 centimetres, their lights do not interfere. As such, different values for the distances d1, d2 and d3 may be obtained, particular if the sensor kit 100 is tilted relative to the surface of the car body part 144.

In the embodiment of FIG. 1, the sensor kit 100 comprises a microcontroller 110 as a processing unit. The microcontroller 110 comprises a data input 112 as an input module, arranged to receive one or more reference parameter values. The received reference parameter values may be stored on a memory 114. Distance data may be sent by the time-of-flight sensor 106 to the data input 112 of the microcontroller 110, and also optionally stored on the memory 114.

The microcontroller 110 is in the embodiment of the sensor kit 100 provided inside the sensor kit body 102. Embodiments of the sensor kit 100 are also envisioned wherein another microcontroller as part of the processing unit is provided outside the sensor kit body 102. This other microcontroller may for example be comprised by one or more external computer devices, such as a server, smartphone, tablet, any other computer device, or any combination thereof.

When at least part of the processing unit is provided outside the sensor kit body 102, a wired or wireless connection may be provided between the sensor module and the microcontroller 110 such that exchange of data is made possible. When a wireless connection is used, for example an NFC, Bluetooth, Wi-Fi or any other protocol can be used for exchange of data.

The microcontroller 112 as a processing unit further comprises a comparison module 116 arranged to compare at least part of the obtained spray job parameter values to corresponding one or more parameter values. The comparison module 116 may thus be arranged to receive at least part of the spray job parameter values and at least part of the reference parameter values, for example from the data input 112, and/or retrieve at least part of the spray job parameter values and at least part of the reference parameter values from the memory 114.

The comparison module 116 is further arranged to generate a comparison data signal based on the outcome of the comparison. The comparison data signal may be received by an output module 118, which may be arranged to and used to send the comparison data signal to other components of the sensor kit 100. In embodiments, the output module 118 may be comprised by the processing unit, the comparison module, the sensor module, or by the sensor kit 100 in general.

The data input 112 may be arranged for receiving user identification data, which may be indicative of a specific user or group of users. For example, user identification data may comprise employer data, a name, and/or any other data from which a specific user of group of user may be identified. The user identification data may be stored on the memory 114. When user identification data is stored on the memory 114, the particular sensor kit 110 may be linked to a specific user.

For providing feedback to a user using the spray gun 140 with the sensor kit 100, a feedback controller 120 as a user feedback module is comprised by the sensor kit 100. The feedback controller 120 is arranged to generate a user feedback signal based on at least part of the comparison data signal. The feedback controller 120 may further be arranged to receive at least part of the comparison data signal from the data output 118 and/or retrieve at least part of the comparison data signal from the memory 144.

In the embodiment of FIG. 1, the feedback controller 120 is provided inside the sensor kit body 102. Embodiments are also envisioned wherein at least part of the feedback controller 120 is provided outside the sensor kit body 102. In such embodiments, at least part of the generated feedback signal may be sent via a wired or wireless connection to an external feedback device, such as a speaker, display, or light.

The feedback controller 120 comprises in the embodiment of FIG. 1 a display 122, arranged for providing a visual signal based on the feedback signal. The display 122 is depicted as being placed in the sensor kit body 102. In embodiments, the display 122 may also be placed at a different location, and the display 122 may for example be a display of a smartphone, tablet, head-up display (HUD), smartwatch, smart glasses, or any other display.

For obtaining orientation data indicative of an orientation of the spray gun 140, embodiments of the sensor kit 100 may comprise an orientation sensor 130 which may be an absolute or a relative orientation sensor 130. The orientation sensor 130 may comprise a magnetometer, accelerometer, compass, gyroscope, any other sensor or any combination thereof. The orientation sensor 130 is arranged to measure angles of the sensor kit and preferably an angle relative to a horizontal plane. Preferably, the orientation sensor is arranged to provide three signals indicative of a first rotation φ over a first axis perpendicular to the spray direction of the nozzle 146, a second rotation θ over a second axis perpendicular to the spray direction and perpendicular to the first axis and a third rotation ψ over a third axis parallel to the spray direction.

As such, the orientation data may comprise data indicative of a roll, yaw and pitch of the spray gun 140. Because the housing body 102 is preferably rigidly connected to the spray gun 140, the roll, yaw, and pitch of the orientation sensor 130 may substantially correspond to the roll, yaw, and pitch of the spray gun 140 or may at least be transformed to the roll, yaw, and pitch of the spray gun 140. Any output parameter or parameters of the orientation sensor 130 may be considered as optional spray job parameters.

Additionally or alternatively, the orientation sensor 130 is arranged to determine at least one angle of the orientation sensor relative to a reference plane. The reference plane may for example be a horizontal plane, a vertical plane, or a plane representing the surface 144 on which the coating 142 is to be applied.

For obtaining movement data indicative of a movement of the spray gun 140, embodiments of the sensor kit 100 may comprise an accelerometer 132 as an example of a movement sensor. The accelerometer 132 is preferably arranged to provide three signals indicative of accelerations in three directions. In a preferred implementation, a first acceleration is measured in a first direction x, a second direction y and a third direction z. In a more preferred embodiment, each direction is parallel to an axis of rotation as discussed above. For example, the first direction is parallel to the first axis, the second direction is parallel to the second axis and the third direction is parallel to the third axis, though other options may be envisaged as well.

The movement data may comprise data indicative of a speed and/or acceleration and/or displacement of the spray gun 140 in one or more directions. Because the housing body 102 is preferably rigidly connected to the spray gun 140, the speed and/or acceleration of the movement sensor 132 may substantially correspond to the speed and/or acceleration of the spray gun 140 or may at least be transformed to the speed and/or acceleration of the spray gun 140. One or more of the speed, acceleration and displacement—either as scalar or vector—may be considered as optional spray job parameters.

As an option, the embodiment of the sensor kit 100 as shown in FIG. 1 comprises a speaker 126 as a speaker for providing an audio signal based on the feedback signal. Depending on the feedback signal, the audio signal may for example have a different volume and/or frequency to indicate a specific type of feedback to the user.

As a further option, the embodiment of the sensor kit 100 as shown in FIG. 1 comprises a vibration unit 128 as a haptic module for providing a vibration as a haptic signal based on the feedback signal. The vibration may be transferred via the connection 104 to the spray gun body 141 which may be held by the user of the spray gun 140. Hence, the user may feel the vibration when holding the spray gun 140.

As an even further option, embodiments of the sensor kit 100 are envisioned wherein the sensor module comprises a temperature sensor for obtaining temperature data indicative of a temperature of the surface 144 that is to be spray painted. In such embodiments, the reference parameter values may comprise a minimum temperature the surface 144 should have. If the comparison module provides a comparison data signal indicative that the temperature of the surface 144 is lower than the minimum temperature, the user feedback module may indicate to the user that the temperature of the surface 144 is too low.

For powering components of the sensor kit 100 requiring electrical energy, the sensor kit 100 may comprise a battery 134 on which electrical energy may be stored. In particular embodiments, the sensor kit housing 102 is substantially sealed, for example to prevent fluids from entering the housing and/or to prevent electrical components to be exposed to paint fumes. Being substantially sealed, it may not be possible to use a wired connection for charging the battery 134 and/or to easily replace a depleted battery.

A coil 136 as a wireless charging module for charging the battery 134 may be comprised by the sensor kit 100, and may be placed inside the sensor kit housing 102 together with the battery 134. By using for example inductive charging, electrical energy may be supplied to the battery 134 via the coil 136. Because this transfer of electrical energy is wireless, no connector has to be placed in the housing 102 and no electrical components have to be exposed to ambient air which may contain flammable coating substances in aerosols.

Figure 2:
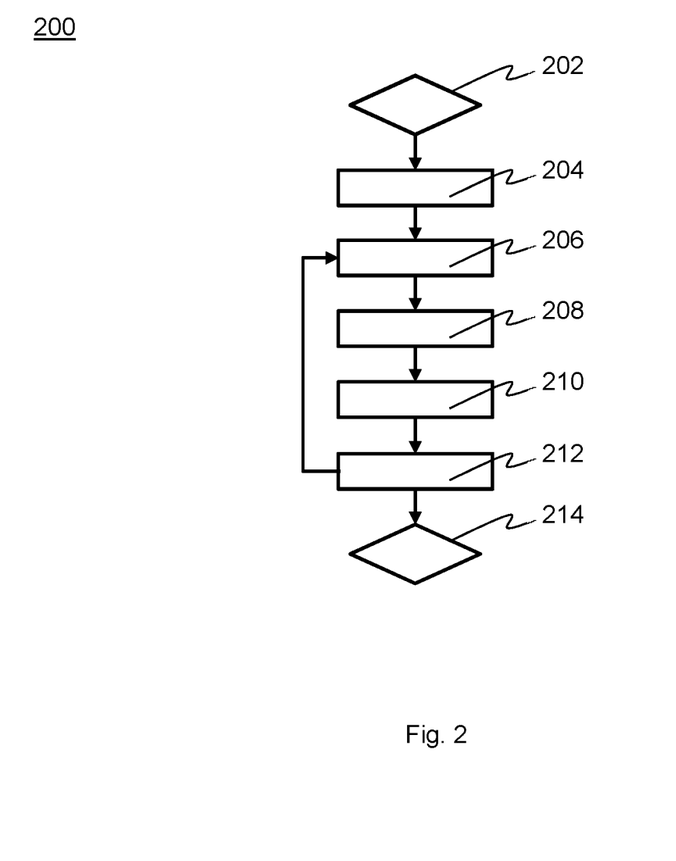
FIG. 2: shows a first flowchart of a method for generating a feedback signal in a sensor kit for a spray gun.

An embodiment of a method for generating a feedback signal in a sensor kit for a spray gun is schematically depicted in FIG. 2, and will be elaborated on in conjunction with the sensor kit 100 as shown in FIG. 1. It will be understood that the method may also be applied in conjunction with other embodiments of the sensor kit 100, and that the sensor kit 100 of FIG. 1 may be used in conjunction with other embodiments of the method depicted by the first flowchart 200. The various parts of the flowchart 200 are briefly summarised below:

| | |
|---|---|
| 202 | start |
| 204 | receive reference parameter values |
| 206 | obtain spray job parameter values |
| 208 | compare spray job parameter values to reference values |
| 210 | output comparison data signal |
| 212 | receive comparison data signal |
| 214 | end |

The method starts in a terminator 202. A second step 204 in the method comprises receiving reference parameter values, for example by the data input 112. At least part of the reference parameter values may be received from an external source, for example a server 150. The connection between the sensor kit 100 and the data output 118 in particular on one hand and the server 150 on the other hand may be executed using Wi-Fi (IEEE 802.11), Bluetooth, any cellular telecommunication standard, including, but not limited to 4G (LTE) and 5G.

The server 150 may comprise a processing unit 152 and at least have access to a mass memory 154 with stored thereon a database comprising reference parameter values. In further embodiments, at least part of the reference parameter values may already be present on the memory 114 of the sensor kit 100.

The memory 154 may be comprised by the server 150, which may be located at the premises where the spray gun 140 is used or any other place; the mass memory 154 may also be located at another position. The mass memory 154 may also have stored thereon computer executable code for programming the processing unit 152 to execute the method discussed below in conjunction with FIG. 3. As such, the mass memory 154 preferably comprises a non-volatile memory.

The server 150 comprises a communication module 156 for communicating with the sensor kit 100 and in particular with the data output 118 and the data input 112.

The server 150 further comprises a server processing unit 152, comprising various sub-unit for dedicated tasks. The sub-units may be hardwired or programmed in the processing unit by means of non-volatile (re-) programmable memories or volatile memories. The server processing unit 152 may comprises an integration unit 160, a spatial calculation unit 162, a convolution unit 164, a synchronisation unit 166 and a process calculation unit 168 for performing various functions as discussed in conjunction with a first flowchart 200 (FIG. 2) and a second flowchart 200 (FIG. 3) as discussed below.

The reference parameter values may comprise a set of coating types and corresponding preferred spraying parameters. Spraying parameters may be specific for a type of coatings. For example, for a particular first coating type, a preferred spraying distance between the nozzle 146 and the surface 144 lies within a first distance interval. Preferred spraying parameters may be provided to the sensor kit upon an operator selecting particular coating by means of the server 150. The reference parameter values may in examples comprise data relating to a minimum and/or maximum speed, orientation, and/or acceleration of the spray gun 140, a minimum or maximum operating temperature and/or pressure, a minimum or maximum flow of coating fluid and/or any other data which may be relevant to a spray job or any combination thereof.

In step 206, spray job parameter values are obtained using at least some sensors comprised by the distance sensor module 106, for example one or more time-of-flight sensors. The third step 206 may commence after the sensor kit 100 is initialised, or when the actual spray job has started. The spray job parameter values may be obtained at a certain amount of data points per second, for a pre-determined amount of time or until it is determined that the spray job has been finished or temporarily paused.

In step 208, which may take place simultaneously with the third step 206, at least part of the spray job parameter values are compared to at least part of the received reference parameter values, for example using comparison module 116.

In step 210, which may take place simultaneously with any of the third step 206 and the fourth step 208, the comparison data signal is outputted to the feedback controller 120 as the user feedback module, for example by the data output 118. This allows the feedback controller 120 to act based on the comparison data signal, or at least a part thereof.

In step 212, which may take place simultaneously with any of the third step 206, the fourth step 208, and step 210, the comparison data signal is received by the feedback controller 120 and a feedback signal is generated based on at least part of the comparison data signal.

The method 200 ends in a terminator 214, for example when the spray job is finished. While the spray gun 140 is being used, any of the second, third, fourth, fifth and sixth steps may be repeated, optionally simultaneously, parallel and/or on a step-by-step basis, preferably real-time or at least substantially real-time such that the operator of the spray gun 140 can react to the feedback.

As an example, the method 200 will be discussed wherein the sensor kit 100 is used for providing feedback to a user using the spray gun 140 on the distance d between the sensor kit 100 and the surface 144.

The method 200 is initialised by the user connecting the sensor kit 100 to the spray gun 140. For example may the spray gun 140 be provided with a magnet, arranged to manipulate a magnetic switch like a reed contact comprised by the sensor kit 100 for switching on the sensor kit 100.

Next, the user selects the type of coating to be sprayed by the spray gun 140, for example by selecting this type via a graphical user interface arranged to allow user interaction with the server 150. Alternatively, the server 150 may be embodied as an application on a smartphone, tablet, personal computer device, or any other device which allows to user to select a type of coating. In embodiments a barcode scanner may be provided for scanning a barcode on a container of coating substance for obtaining data indicative of the type of coating. Parts of the scanner may be incorporated in the sensor kit 100.

Upon the user selecting the type of coating, the server 150 looks up reference parameter values corresponding to the type of coating, for example in an internal or external memory, directly or via a connection such as a LAN, WAN, internet, Wi-Fi, Bluetooth, or any other wired or wireless connection. A part of the reference parameter values may be provided locally, whereas another part of the reference parameter values may be provided at a remote location.

The server 150 sends the reference parameter values to the sensor kit 100, of which the data input 112 receives the reference parameter values and stores it on the memory 114. The reference parameter values in this example comprise a desired distance range, particular to the selected type of coating. The sensor kit 100 may aid the user in keeping the spray gun 140 within this desired distance range, by providing feedback. The desired distance range as an example of reference parameter values may have been supplied by the manufacturer of the coating.

The desired distance range may correspond to the distance between the nozzle 146 of the spray gun and the surface 144, or between any other component of the spray gun and the surface 144, or to the distance d between the time-of-flight sensor 106 and the surface 144. In any case, because the connection between the sensor kit body 102 and the spray gun 140 is preferably substantially rigid and the dimension of components of the sensor kit 100 will be known, any of these distances may be indicative for the distance between the nozzle 146 and the surface 144.

Alternatively, when the housing of the sensor kit is not substantially rigidly connected to the spray gun, a dynamic model of the substantially not rigid connection may be used for mapping data obtained by the sensor kit to data relevant to the spray gun.

During the use of the spray gun 140, which period of time may be referred to as the spray job, the time-of-flight sensor 106 obtains distance data indicative of the distance d between the time-of-flight sensor 106 and the surface 144 facing the time-of-flight sensor 106. This distance data is then used by the comparison module 116 which compares the obtained data to the desired distance range.

A result of this comparison may comprise a value indicating whether a particular data point in the distance data lies within the range, or falls outside the range. A result of this comparison may alternatively or additionally comprise a value indicating, when a particular data point falls outside the range, if the particular data point is too large, to small, and/or by what amount the data point falls outside the range.

The output module outputs the comparison data signal to the feedback controller 120, which may be arranged to provide feedback of the comparison data signal to the user using the spray gun 140. The feedback is preferably provided substantially in real-time such that the user can alter his usage of the spray gun 140 adequately in accordance with the provided feedback.

After having received the comparison data signal, the feedback controller 140 generates a feedback signal based on at least part of the comparison data signal.

In a particular embodiment, the feedback controller 140 comprises an LED-module 126 comprised by an optical module for providing a visual signal to the user based on the generated feedback signal. The LED-module 126 may comprise one or more LEDs, which may be arranged to provide light of a single colour or may be controllable to provide light of different colours, for example red, green, blue, or a combination thereof.

When an obtained distance lies within the desired distance range, the feedback controller 140 may control the LED-module 126 to show a green light as an example of coloured light. When an obtained distance falls out of the desired distance range, the feedback controller 140 may control the LED-module 126 to show a red light as an example of a differently coloured light.

In embodiments, the feedback controller 140 comprises a display 122 as part of the optical module, arranged for providing a visual signal based on the feedback signal. The display 122 may be arranged to show a value corresponding to the actual distance data obtained by the time-of-flight sensor 106, and may thus be arranged to show numerical values corresponding for example to the measured distance in millimetres or inches. The obtained distance data may either be supplied to the display 122 directly, or via the feedback controller 140.

If the feedback controller 140 receives comparison data signals corresponding to distance data falling outside the desired range for a pre-determined amount of time, the feedback controller 140 may be arranged to generate a feedback signal to control the vibration unit 128 to provide the user with haptic feedback indicating that the desired distance has not been met for the pre-determined amount of time.

Figure 3:
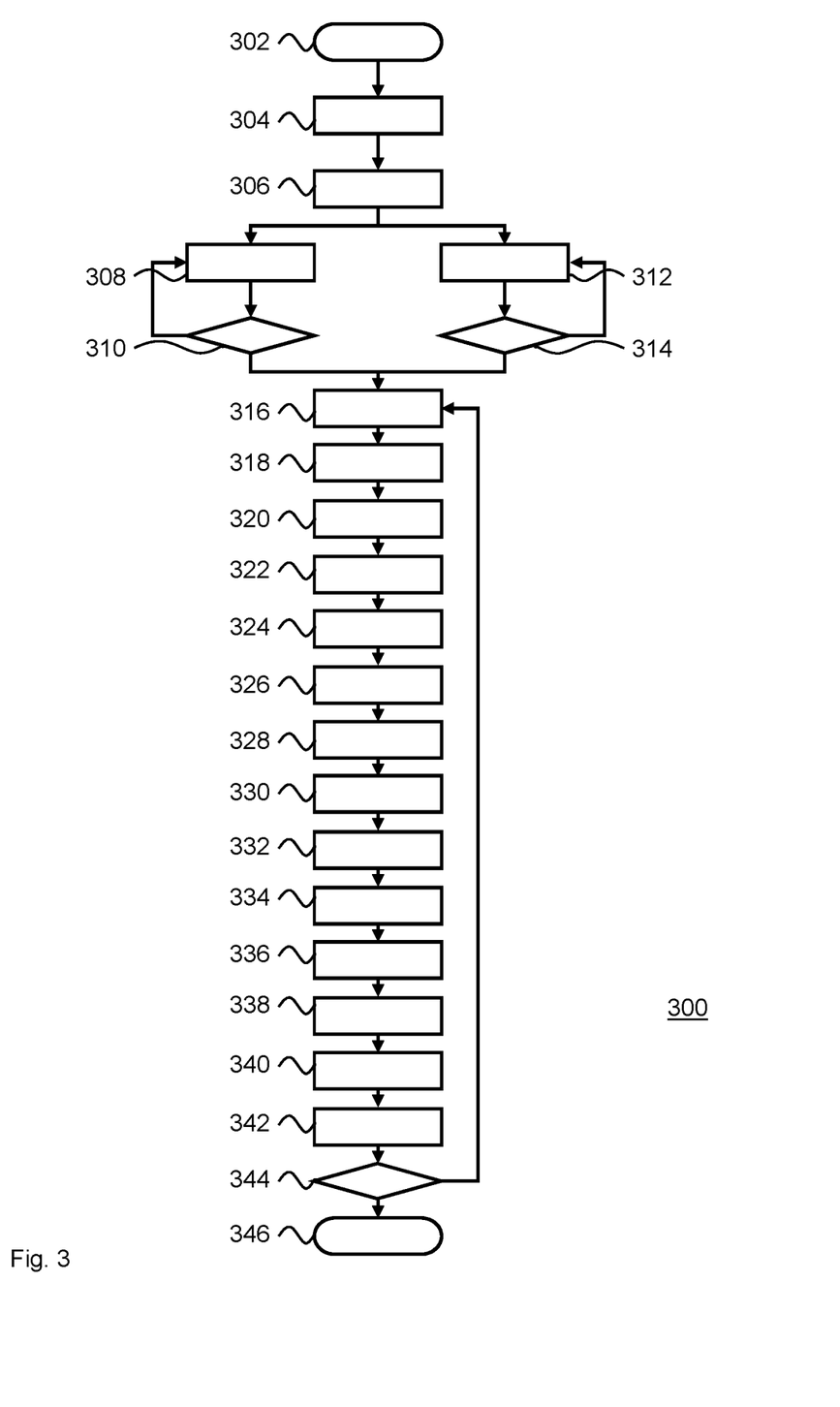
FIG. 3: shows a second flowchart of a method for reconstructing coating data.

FIG. 3 depicts a second flowchart 300 of reconstructing coating data, which may be performed in the server system 150 for communicating with a sensor kit 100 for the spray gun 140, or on a different computer device such as a smartphone or tablet computer. The various parts of the second flowchart 300 are briefly summarised below:

| | |
|---|---|
| 302 | Start |
| 304 | Obtain coating data |
| 306 | Obtain paint model data |
| 308 | Monitor acceleration data |
| 310 | Zero crossing |
| 312 | Monitor flow data |
| 314 | Flow |
| 316 | Monitor distance data |
| 318 | Monitor rotational data |
| 320 | Monitor acceleration data |
| 322 | Monitor flow data |
| 324 | Calculate movement data |
| 326 | Determine surface orientation |
| 328 | Determine angle to surface |
| 330 | Calculate intersection surface to spray cone |
| 332 | Determine coat parameters in intersection plane |
| 334 | Synchronise flow data and sensor kit data |
| 336 | Calculate coating deposition rate in intersection plane |
| 338 | Calculate coating layer thickness on surface |
| 340 | Calculate cured layer thickness on surface |
| 342 | Monitor flow data |
| 344 | Flow |
| 346 | End |

The process starts in a terminator 302 and continues with step 304 in which coating data is obtained. Such coating data may be obtained on received data from a user of the spray gun 140. The input may be provided manually, by receiving data from a keyboard, by means of a barcode scanner, by receiving input through selection of an icon, other, or a combination thereof. The coating data comprises characteristics specifically related to at least one of the coating liquid, like viscosity, brand name, solution liquid content, data on layer thickness reduction over curing, desired distance to the surface to coat, other, or a combination thereof.

In step 306, paint model data is obtained. The paint model data comprises data mainly related to the spray gun 140. The paint model data comprises data on the structure of the spray gun 140 and the structure of a spray cone provided by the nozzle 146. The data may be two-dimensional, only perpendicular to the direction of spraying, or three-dimensional. The paint model data may comprise average flow density, median flow density, maximum flow density, minimum flow density, flow density as a function of location within the cone, cone apex, cone shape (circular or non-circular elliptical) and one or more of these parameters having a value depending on distance from the spray gun 140 or the nozzle 141 to the surface of the car body part, coating material characteristics, air pressure, air flow, air flow velocity, other, or a combination thereof.

The actual data of the spray cone may be dependent on characteristics of the coating material, air pressure, an amount of movement of a trigger of the spray gun 140, distance to the car body part 144, other, or a combination thereof. The paint model data may be obtained in the same fashion as the coating data. The data thus described as being obtained may be obtained from the mass memory 214 by the processing unit 152.

In step 308, acceleration data as received from the accelerometer 132 as comprised by the sensor kit 100 is monitored. If the acceleration in a particular direction, in particular in a direction perpendicular to the spray direction and in a left-right direction when the spray gun 140 is held by an operator, crosses zero at least one time and preferably two or more times, it is detected, in step 310, that the spray gun 140 is in use for spraying.

To reduce a risk of erroneous detection, the detection of zero crossings of the acceleration value may be combined with determining that the time period between two or more subsequent crossings is substantially the same. In this way, a swinging movement of the spray gun 140 may be detected as an indication of the operator executing a paint job.

Alternatively or additionally, flow data may be monitored. Flow data may be monitored by monitoring whether a trigger of the spray gun 140 is pulled, for example by receiving a signal from a trigger sensor (not shown), which may be a binary, otherwise digital or analogue continues signal. The flow rate may be provided with a timestamp, providing indications of the flow rate at multiple moments in time.

From the flow data, a mass flow rate or a volume flow rate through the nozzle may be determined. By determining whether the trigger is opened or not and combining the determined state of the trigger with a nominal flow rate of the nozzle, a total mass flow rate or a total volume flow rate may be determined at a particular moment the trigger is operated. By determining how far or how much the trigger is operated, combined with a relation between trigger operation and mass flow rate or volume flow rate, an actual flow rate at a particular moment may be determined.

Alternatively or additionally, at least one of a flow of air and a flow of coating material may be monitored by means of a flow sensor (not shown) and the signal provided by such sensor may be monitored by means of the processing unit 152. The total flow data—mass flow (rate) or volume flow (rate)—may thus be obtained directly by means of a flow sensor.

If at least one of a flow of the air, pressing of the trigger and flow of the coating material, is detected, it is determined in step 314 that the spray job has started. In on embodiment, the determination is only made if the signal is detected for a time period longer than a pre-determined time interval.

If, based on evaluation of sensor data, it has been determined that the paint job has started, distance data provided by the distance sensor module 106 is monitored in step 316, rotational data provided by the orientation sensor 130 is monitored in step 318, acceleration data as provided by the accelerometer 130 is monitored in step 320 and flow data provided by sensors as discussed above is monitored in step 322. The monitoring steps may be executed in parallel or, intermittently and repeatedly (interweaved), in series.

Based on the accelerometer data, the speed by which the operator moves the spray gun 140 and the distance by which the operation moves the spray gun 140 may be calculated by integrating the data received from the accelerometer one or two times over time; this action may be performed by the integration unit 160. Prior to integration, data provided by the accelerometers may be processed using statistical parameters, for example by removing outliers, smoothing a signal over time, for example by determining a moving average or average median, determining what an outlier is, for example based on a standard deviation, for example over time. Alternatively or additionally, the acceleration data signals may be filtered, for example using a Kalman filter. Alternatively or additionally, displacement data is obtained differently, for example using beacons in a spray room.

If the spray gun is properly aimed at the car body part 144, data of acceleration in directions parallel to the car body part 144 is sufficient as the spray direction is always to be perpendicular to the surface of the car body part. However, this may not always be the case, for which reason it is preferred to process acceleration in all directions.

In step 326 may, optionally, orientation of surface of the car body part 144 be determined. In one implementation, the surface is assumed to be horizontal or vertical.

In another implementation, the spray gun is assumed to be mainly held in a fashion perpendicular to the surface. Based on the orientation data provided by the orientation sensor 130, the orientation of the surface may be determined, under an assumption that the spray gun 140, at least on average, follows the surface.

In step 328 orientation of the spray gun 140 relative to the surface of the car body part 144 may be determined. In one implementation, data on the distance to the surface may be taken into account. If the distance sensor module 106 comprises multiple time of flight sensor or other sensors having equivalent functionality and all measured distances are the same, the spray gun 140 is aimed perpendicularly at the surface. If the distances are different, an orientation of the spray gun 140 or the orientation of the spray cone provided by the nozzle 146 may be determined, other than perpendicular.

In an implementation wherein the surface is assumed to be horizontal or vertical, using data from the orientation sensor 130, over one or more axes, may be used to determine an orientation of the spray gun relative to the surface.

In another implementation, where the orientation of the surface is determined using the data from the orientation sensor module 130, the orientation of the spray gun 140 relative to the surface may be determined by detecting deviations in the signal from the orientation sensors from an average obtained over time, for example over two, five or ten seconds.

Based on the data calculated in step 328, data from the distance sensor module 106, the paint model data, coating data, other, or a combination thereof, an intersection or intersection plane of the spray cone and the surface of the car body part 144 is determined in step 330; this action may be performed by the spatial calculation unit 162. With the information of the intersection plane, coating parameters in the intersection plane may be determined, taking into account the paint model data and, optionally, the coating data.

With the paint model comprising flow density data as a function of a location in the cone, in a numerical representation, analytical representation, other, or a combination thereof, coat parameters and in particular data related to flow density may be determined in step 332. For particular locations in the intersection plane, mass or coat volume per volume per reference point per second or other time unit may be determined. In this way, deposition of coating, in mass, volume, or both, per unit area per unit time may be determined in step 334.

Optionally, flow data may be taken into account in the deposition model, if such data is available and varies over time. Preferably, the flow data and the data from the sensor kit 100 is synchronised over time in step 332, prior to determining the deposition rate per unit area per time; this may be handled by the synchronisation unit 166. The data from the sensor kit 100 and the data from a sensor providing a signal indicative of flow of coating material may be time stamped using network data, from a network over which both sensor packages provided data to the server 150. Other sources of time and preferably a single time source or multiple synchronised time sources may be considered as well. Next, the deposition rate per unit area per time may be determined based on the time synchronised data, following matching and aligning the data of the various datasets based on time stamps provided with data in the datasets.

Figure 4:
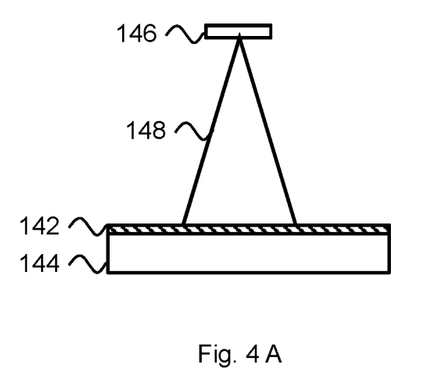
FIG. 4A to 4F: show various examples of orientations of the nozzle and cross-sections of the surface to coat and the spray cone.

FIG. 4 A through FIG. 4 F depict the result of step 332. FIG. 4 A shows the nozzle 146 providing a spray cone 148 at a first distance towards the surface of the car body part 144, depositing a layer 142 of coating material. FIG. 4 B shows an indication of flow density in the plane where the spray cone 148 intersects the surface. The darker the colour, the higher the flow rate density. In FIG. 4 B, the spray cone is assumed to have an elliptical, non-circular cross-section, which corresponds to a significant amount of spray-guns commercially available. Alternatively, the spray cone as defined by the paint model data may have a circular cross-section.

FIG. 4 C shows the nozzle 146 at a second distance from the surface, the second distance being smaller than the first distance shown in FIG. 4 A. the smaller distance results in a smaller cross-sectional area in the cross-section between the spray cone 148 and the surface of the car body part 144. Hence, the elliptical spray density as depicted by FIG. 4 D is smaller.

The density distribution within the cross-sectional area is equivalent. It is noted that the total density, over the whole cross-sectional area, i.e. the integration of the flow density per unit area over the area over the cross-sectional area, is preferably the same for FIG. 4 B and FIG. 4 D. In another implementation, loss of coating material per distance away from the nozzle 146 may be taken into account.

FIG. 4 E shows the nozzle 146 being placed under and angle relative to the surface of the car body part 144. With an elliptical cross-section of the spray cone 148, this may result in a cross-sectional area 142 as depicted by FIG. 4 F. In further implementations, occlusions due obstructions protruding from the surface or indentations in the surface may also be taken into account when determining deposition of coating on the surface per unit area and per unit time.

Next, taking into account the data as depicted by FIG. 4 B, FIG. 4 D and FIG. 4 F—whichever may be applicable —, the movement data or displacement data obtained by dual integration of the acceleration data—or other data indicative of movement—and time, the total amount of deposited coating material may be determined in step 338. One option to do so is by convolution of the movement of the spray gun over time and the deposition rate over time, which may be handled by the convolution unit 164. Also other data may be taken into account, including, but not limited to ambient pressure, ambient temperature, humidity In step 340, coating data on curing of the coating material may be used to determine, based on the result of step 338, a thickness of the coating layer after curing, by the process calculation unit 168.

The process as discussed above may be executed continuously, while spraying continues. In particular determining final coating thickness, before or after curing, may be determined after the coating process is finished. Alternatively, some steps are executed when the spray job is finished.

An end of the spray job may be determined as a point when monitored flow data indicates that no flow is present, momentarily or during a particular time interval. Alternatively or additionally, absence of detection of a swinging motion, as discussed above, may also be considered for determining that the spray process has ended. Once the process is finalised, the procedure ends in a terminator 346.

In summary, the various aspects and implementations thereof relate to reconstruction of a layer of coating; by measuring a position of a spray gun relative to a physical surface to coat, using data on technical characteristics of the spray gun, like a spray cone the spray gun may produce and data on a coating fluid used, characteristics of a coating layer thus physically deposited may be reconstructed. With data being recording during the spray job, this is faster and more accurate than measuring layer thickness at various locations, either pre-determined or randomly. By determining flow characteristics in a spray cone and position of the spray cone relative to the surface over time and using a model of the spray cone, deposition of the layer of coating may be determined and the final layer, cured or uncured, may be reconstructed, including thickness.

The invention claimed is:

1. Method of electronically tracking of spray coating of a coating fluid on a physical surface by a spray gun arranged to spray the coating fluid in a spray direction, the method comprising, in an electronic computing system:
   receiving, from a distance sensor module connected to the spray gun and comprising at least one distance sensor, distance data provided with a second timestamp, the distance data indicating a physical distance between the spray gun and the surface;
   obtaining, from an electronic memory, three-dimensional coating model data of a spray cone associated with the spray gun;
   receiving, from a positional sensing system connected to the spray gun, position data provided with a third timestamp, the position data providing an indication of the spray gun relative to a first position on the physical surface;
   obtaining coating fluid flow data provided with a first timestamp, the fluid flow data providing an indication of a mass flow rate of the coating fluid through the spray gun;
   adjusting the three-dimensional coating model data based on the coating fluid flow data;
   synchronizing the coating fluid flow data, the distance data and the position data over time based on the first timestamp, the second timestamp and the third timestamp;
   calculating, based on the synchronized distance data, the position data and the adjusted three-dimensional coating model, coating deposition area data of positional spray coating deposition on an area of the physical surface per unit of time; and
   calculating, based on the coating deposition area data of positional spray coating deposition on the area of the physical surface per unit of time, thickness of a layer of coating fluid on the physical surface.

2. Method according to claim 1, further comprising calculating, based on the distance data, the position data, the coating deposition area data and time, characteristics of a layer of coating fluid on the physical surface.

3. Method according to claim 1, wherein the positional sensing system comprises a first accelerometer for determining a first acceleration substantially perpendicular to the spray direction and a second accelerometer for determining a second acceleration substantially perpendicular to the spray direction, the first direction being substantially perpendicular to the second direction, the method further comprising:
   integrating the first acceleration in time twice over time for obtaining first displacement data in the first direction as a first part of the position data; and
   integrating the second acceleration in time twice over time for obtaining second displacement data in the second direction as a second part of the position data.

4. Method according to claim 1, further comprising:
   determining, based the received position data, whether the spray gun is moving in a swinging motion;
   starting the calculating if it is determined that the spray gun is moving in a swinging motion.

5. Method according to claim 4, wherein:
   the positional sensing system comprising at least one of a first accelerometer and a second accelerometer and
   determining whether the spray gun is moving in a swinging motion comprising determining whether the acceleration value of at least one of a first accelerometer and a second accelerometer changes sign at least two times during a pre-determined interval.

6. Method according to claim 5, wherein determining whether the spray gun is moving in a swinging motion comprising determining whether the acceleration value of at least one of a first accelerometer and a second accelerometer changes sign at least three times during a pre-determined interval and a first time period between a first sign change and a second sign change varies from a second time period between the second sign change and a third sign change by less than a pre-determined amount.

7. Method according to claim 1, further comprising:
   determining an orientation of the spray gun and the spray direction relative to the physical surface; and
   calculating the coating deposition area data of positional spray coating deposition is also based on the orientation.

8. Method according to claim 7, wherein the distance sensor module comprises multiple distance sensors and determining the orientation comprises:
   obtaining multiple distance sensor values from the multiple distance sensors;
   determining the orientation based on differences between the multiple distance sensor values.

9. Method according to claim 7, further comprising:
receiving, from the positional sensing system, rotational data indicative of a rotational position of the spray gun transversal to the spray direction;
determining, based on the position data and the rotational data, the orientation.

10. Method according to claim 1, wherein calculating the coating deposition area data of positional spray coating deposition comprises determining cone intersection plane coating fluid data, based on the distance data and the three-dimensional coating model data; and
calculating the coating deposition area data of positional spray coating deposition is based on the cone intersection plane coating fluid data.

11. Method according to claim 10, further comprising:
determining an orientation of the spray gun and the spray direction relative to the physical surface; and
calculating the coating deposition area data of positional spray coating deposition is also based on the orientation;
wherein the calculating is based on the orientation data.

12. Method according to claim 1, further comprising:
receiving an input related to selection of a pre-determined coating fluid; and
obtaining the three-dimensional coating model data of the spray cone associated with the spray gun in response to providing data related to the pre-determined coating fluid to the electronic memory.

13. Method according to claim 1, further comprising obtaining data for providing the first timestamp, the second timestamp and the third timestamp from a network source; and
providing the coating fluid flow data with the first timestamp, the distance data with the second timestamp and the position data with the third timestamp.

14. Method according to claim 1, further comprising:
obtaining curing data related to the coating fluid;
based on the curing data, determining cured thickness of a cured layer of coating fluid on the physical surface.

15. Method according to claim 1, further comprising:
determining, based on the distance data, a distance between the spray gun and the physical surface;
accessing a desired distance range;
comparing the distance with the desired distance range; and
generating feedback control to alter the distance based on the comparison.

* * * * *